United States Patent
Han et al.

(10) Patent No.: US 9,369,023 B2
(45) Date of Patent: Jun. 14, 2016

(54) MOTOR UNIT HAVING COOLING CHANNEL

(71) Applicants: Hyundai Motor Company, Seoul (KR); Kia Motors Corporation, Seoul (KR)

(72) Inventors: Dongyeon Han, Seoul (KR); Young Jin Seo, Gyeonggi-do (KR); Hyoungjun Cho, Seoul (KR); Myeong Kyu Jung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 351 days.

(21) Appl. No.: 14/107,760

(22) Filed: Dec. 16, 2013

(65) Prior Publication Data

US 2014/0167535 A1   Jun. 19, 2014

(30) Foreign Application Priority Data

Dec. 18, 2012  (KR) .................. 10-2012-0148701

(51) Int. Cl.
*H02K 9/00* (2006.01)
*H02K 5/20* (2006.01)
*H02K 9/19* (2006.01)

(52) U.S. Cl.
CPC ... *H02K 5/20* (2013.01); *H02K 9/19* (2013.01)

(58) Field of Classification Search
CPC ............ H02K 9/19; H02K 5/20; H02K 9/005
USPC .................................. 310/52, 54, 58–59, 89
See application file for complete search history.

(56) References Cited

U.S. PATENT DOCUMENTS

| | | | | |
|---|---|---|---|---|
| 6,087,744 A * | 7/2000 | Glauning | ................ | H02K 1/32 310/58 |
| 6,909,210 B1 * | 6/2005 | Bostwick | ................ | H02K 5/20 310/254.1 |
| 7,591,147 B2 * | 9/2009 | Masoudipour | ........ | F25B 31/006 165/169 |
| 7,737,585 B2 * | 6/2010 | Bahr | ........................ | H02K 5/20 310/52 |
| 8,183,723 B2 * | 5/2012 | Fee | .......................... | H02K 5/20 165/156 |
| 2008/0100174 A1 * | 5/2008 | Stahlhut | ................... | H02K 1/20 310/268 |
| 2013/0307357 A1 * | 11/2013 | Maksumic | ............... | H02K 5/20 310/54 |
| 2013/0342046 A1 * | 12/2013 | Hyun | ...................... | H02K 5/20 310/54 |

* cited by examiner

*Primary Examiner* — Thanh Lam
(74) *Attorney, Agent, or Firm* — Mintz Levin Cohn Ferris Glovsky and Popeo, P.C.; Peter F. Corless

(57) ABSTRACT

A motor unit for a vehicle is provided with a cooling channel cooling channel formed within a motor housing of the motor unit, and forming a flow channel that allows coolant to flow through the flow channel. The cooling channel includes: a supply channel portion having an inlet; an exhaust channel portion having an outlet; and a flow channel changing portion connecting the supply channel portion and the exhaust channel portion to allow a coolant supplied through the inlet of the supply channel portion to be discharged through the outlet of the exhaust channel portion, where at least one of inner protrusion portions and outer protrusion portions are formed on an inner circumferential surface and an outer circumferential surface, respectively, of the supply channel portion or the exhaust channel portion, protruding toward the motor shaft, and extending in a circumferential direction.

7 Claims, 5 Drawing Sheets

Related Art

Area = 14ab
Length Of Cooling Surface = 14a + 4b

Proposed Technique

Area = 14ab
Length Of Cooling Surface = 14a + 16b

MOTOR UNIT HAVING COOLING CHANNEL

CROSS-REFERENCE TO RELATED APPLICATION

This application claims under 35 U.S.C. §119(a) priority to and the benefit of Korean Patent Application No. 10-2012-0148701 filed in the Korean intellectual Property Office on Dec. 18, 2012, the entire contents of which are incorporated herein by reference.

BACKGROUND (a) Field of the Invention

The present invention relates to a motor unit having a cooling channel capable of cooling a high temperature unit by using a coolant (or cooling water) in a high output electric motor for driving a vehicle, thus enhancing cooling efficiency and increasing operational stability.

(b) Description of the Related Art

Generally, a motor structure of an electric vehicle includes a shaft for supporting a rotor, the rotor being rotatably supported by the shaft, a stator fixedly positioned to face the rotor, and a motor housing in which the stator is press-fit, the motor housing positioned to face the rotor for protecting and supporting the stator.

A high output motor is required to drive an electric vehicle or a hybrid vehicle. Thus, when power is applied to drive the high output motor, the rotor positioned to face the stator is rotated at a high speed, where the rotor is supported by the shaft within the stator by magnetism generated by the stator.

In general, a related art motor cooling structure is configured to employ a forced air cooling scheme (i.e., using air), or a scheme of performing cooling by circulating a coolant such as water.

However, in the case in which the cooling scheme of the related art motor is a water cooling scheme, a cooling channel is required to circulate a coolant such as water. Thus, if a heat dissipation area of a water cooling structure (which may include a jacket) formed within a motor is small, the coolant does not flow smoothly, thus degrading cooling performance.

The above information disclosed in this Background section is only for enhancement of understanding of the background of the invention and therefore it may contain information that does not form the prior art that is already known in this country to a person of ordinary skill in the art.

SUMMARY

The present invention provides a motor unit having advantages of effectively cooling a driving motor by enhancing cooling efficiency with a cooling channel in which a coolant flows to effectively cool a high heat generation portion of the driving motor.

An exemplary embodiment of the present invention provides a motor unit, including: a motor housing having a motor shaft, and a rotor fixed to the motor shaft; a stator fixed to an inner circumferential surface of the motor housing to cover the rotor disposed in one side of the motor shaft; and a cooling channel formed within the motor housing and forming a flow channel for allowing a coolant to flow therein, where the cooling channel includes: a supply channel portion having an inlet formed in a first end portion of the supply channel portion to allow the coolant to be introduced therethrough and extending in a circumferential direction of the motor housing; an exhaust channel portion having an outlet formed in a first end portion of the exhaust channel portion such that it corresponds to the inlet, to allow the coolant to be discharged therethrough and extending in the circumferential direction of the motor housing; and a flow channel changing portion connecting a second end portion of the supply channel portion and a second end portion of the exhaust channel portion to allow the coolant supplied through the inlet of the supply channel portion to be discharged through the outlet of the exhaust channel portion, where at least one of inner protrusion portions and outer protrusion portions are formed on an inner circumferential surface and an outer circumferential surface, respectively, of the supply channel portion or the exhaust channel portion, protruding toward the motor shaft, and extending in a circumferential direction.

The supply channel portion may include a supply extending portion having a width extending in a direction in which the coolant flows from the inlet, and the exhaust channel portion may have an exhaust reduced portion having a width reduced in a direction in which the coolant flows from the outlet.

The flow channel changing portion may have a semi-circular shape.

The inner protrusion portions and the outer protrusion portions may be disposed in a crisscross manner in a length direction of the motor shaft.

Inner rib recesses or outer rib recesses may be formed in a width direction in an inner side or outer side of the exhaust channel portion or the supply channel portion such that a flow channel of the coolant is narrowed.

The inner rib recesses or the outer rib recesses may be formed at pre-set intervals in a direction in which the coolant flows, and the inner rib recesses or the outer rib recesses may be formed in a crisscross manner in the direction in which the coolant flows.

According to embodiments of the present invention, in the case of the motor unit having a cooling channel, since the other end portion of the supply channel portion and the other end portion of the exhaust channel portion are connected by the flow channel changing portion formed to have a curved shape, overall flow resistance of a coolant is reduced, enhancing cooling efficiency.

Also, since the inner protrusion portions and the outer protrusion portions of the cooling channel are alternately formed in a length direction of the motor shaft, forming the inner recesses and the outer recesses therebetween, the overall effective cooling area can be increased to enhance overall cooling efficiency.

A cooling channel for a motor housing preferably includes: a supply channel portion having an inlet formed in a first end portion of the supply channel portion to allow a coolant to be introduced therethrough and extending in a circumferential direction of the motor housing; an exhaust channel portion having an outlet formed in a first end portion of the exhaust channel portion such that it corresponds to the inlet, to allow the coolant to be discharged therethrough and extending in the circumferential direction of the motor housing; and a flow channel changing portion connecting a second end portion of the supply channel portion and a second end portion of the exhaust channel portion to allow the coolant supplied through the inlet of the supply channel portion to be discharged through the outlet of the exhaust channel portion, where at least one of inner protrusion portions and outer protrusion portions are formed on an inner circumferential surface and an outer circumferential surface, respectively, of the supply channel portion or the exhaust channel portion, protruding toward the motor shaft, and extending in a circumferential direction.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

DETAILED DESCRIPTION OF EMBODIMENTS

An exemplary embodiment of the present invention will hereinafter be described in detail with reference to the accompanying drawings.

Figure 1:
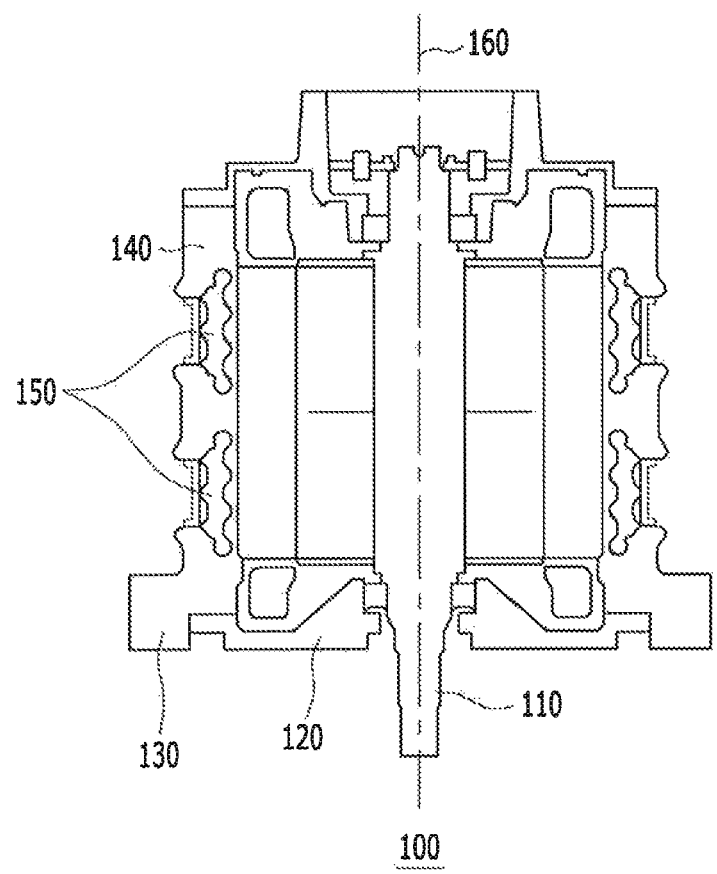
FIG. 1 is a schematic cross-sectional view of a motor unit having a cooling channel according to an embodiment of the present invention.

FIG. 1 is a schematic cross-sectional view of a motor unit having a cooling channel according to an embodiment of the present invention.

Referring to FIG. 1 a motor unit 100 includes a motor shaft 110, a rotor 120, a stator 130, and a motor housing 140. A cooling channel 150 is formed within the motor housing 140 along an outer circumference of the motor housing 140.

The motor shaft 110 is installed in the motor housing 140 such that it is rotatable along a virtual rotational shaft or axis 160, and the rotor 120 is fixed to an outer circumferential surface of the motor shaft 110.

The stator 130 is fixedly installed on an inner circumferential surface of the motor housing 140 to cover an outer circumferential surface of the rotor 120, and the stator 130 and the rotor 120 are disposed such that an inner circumferential surface of the stator 130 and the outer circumferential surface of the rotor 120 have a pre-set gap formed therebetween.

The cooling channel 150 is formed within the motor housing 140 along the circumference of the motor housing 140. The structure of the cooling channel 150 will be described in detail with reference to FIGS. 2 and 3.

Figure 2:
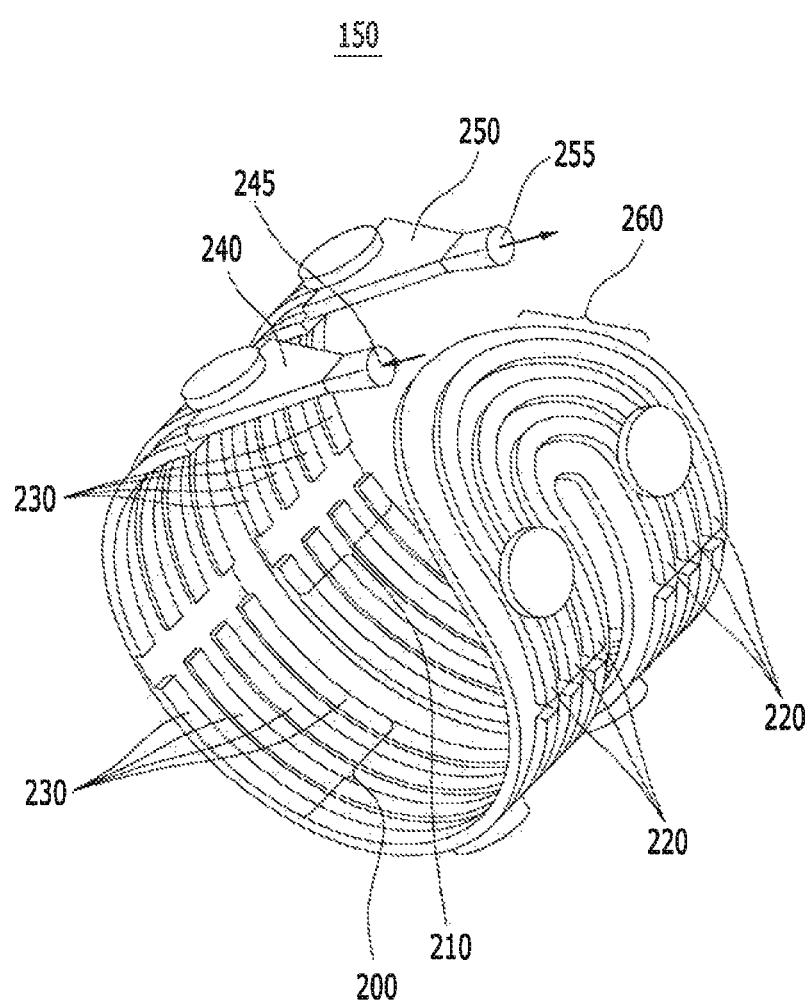
FIG. 2 is a perspective view illustrating a shape of the cooling channel of the motor unit depicted in FIG. 1.

FIG. 2 is a perspective view illustrating a shape of a cooling channel 150 of the motor unit 100. In FIG. 2, a shape of the cooling channel 150 formed within the motor housing 140 is illustrated in a three-dimensional manner. As described in greater detail below, protrusions of the cooling channel 150 preferably correspond to recesses formed within the motor housing 140.

Referring to FIG. 2, the cooling channel 150 includes an inlet 245, an inlet extending portion 240, a supply channel portion 200, a flow channel changing portion 260, an exhaust channel portion 210, an exhaust reduced portion 250, and an outlet 255. A coolant preferably is introduced through the inlet 245 and spreads to have a greater area through the inlet extending portion 240. The inlet extending portion 240 is connected to the supply channel portion 200, and the supply channel portion 200 extends in a circumferential direction of the motor housing 140. In addition, the outlet 255 is formed at a position corresponding to the inlet 245, and the exhaust reduced portion 250 is formed between the outlet 255 and the exhaust channel portion 210. The supply channel portion 200 and the exhaust channel portion 210, although connected together as shown in FIG. 2, can be understood to each have first end portions (i.e., corresponding to the inlet 245 and the outlet 255, respectively), and second end portions that are respectively interconnected in the flow channel changing portion 260.

The other (second) end portion of the supply channel portion 200 and the other (second) end portion of the discharge channel portion 210 are connected by the flow channel changing portion 260 formed to have a substantially curved shape. As shown in FIG. 2, the flow channel changing portion 260 is formed along semicircular lines.

Inner protrusion portions 230 are formed to be protruded toward the motor shaft 110 on inner circumferential surfaces of the supply channel portion 200 and the exhaust channel portion 210, and outer protrusion portions 220 are formed to be protruded in the opposite direction of the motor shaft 110 on outer circumferential surfaces of the supply channel portion 200 and the exhaust channel portion 210. The inner protrusion portions 230 and the outer protrusion portions 220 extend by a pre-set length in a rotation direction of the motor shaft 110.

Figure 3:
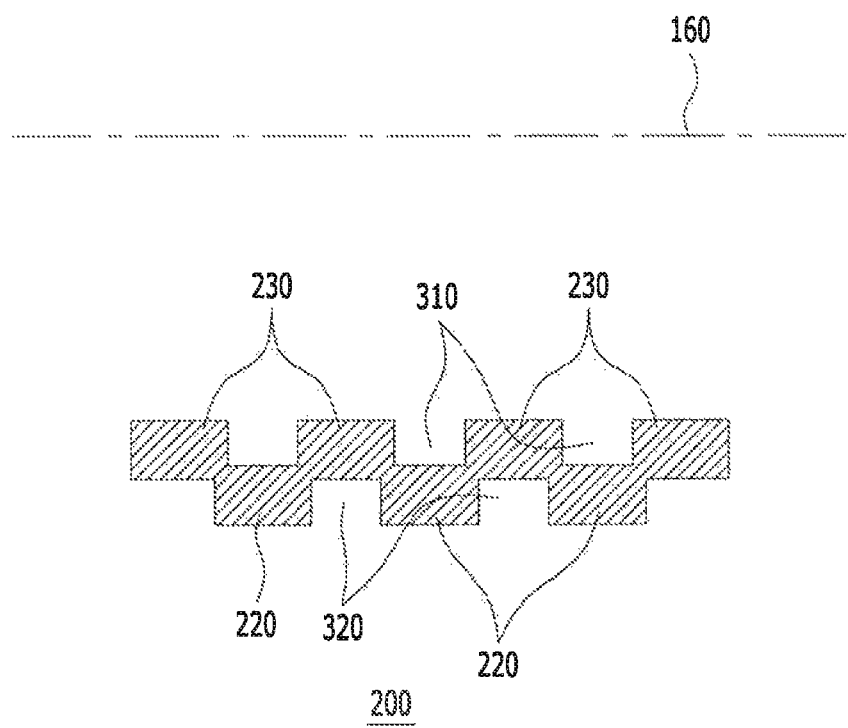
FIG. 3 is a partial cross-sectional view illustrating a shape of the cooling channel of the motor unit of FIGS. 1-2.

FIG. 3 is a partial cross-sectional view illustrating a shape of the cooling channel of the motor unit of FIGS. 1-2. Referring to FIG. 3, the inner protrusion portions 230 are formed to be protruded from the inner circumferential surface of the supply channel portion 200, and the outer protrusion portions 220 are formed to be protruded from the outer circumferential surface of the supply channel portion 200. The inner protrusion portion 230 and the outer protrusion portion 220 may be continuously formed by a pre-set length along the circumference of the motor housing 140. As shown in FIG. 3, inner recesses 310 are formed between the inner protrusion portions 230, and outer recesses 320 are formed between the outer protrusion portions 220. Namely, the inner protrusion portions 230 and the outer protrusion portions 220 may be alternately formed in a length direction of the motor shaft 110, forming the inner recesses 310 and the outer recesses 320 therebetween to increase an overall effective cooling area, and thus, enhancing overall enhancing cooling efficiency.

In addition, the flow channel changing portion 260 preferably has a curved shape useful as a coolant flowing shape, thus minimizing flow resistance of a coolant to enhance overall cooling efficiency.

Figure 4:
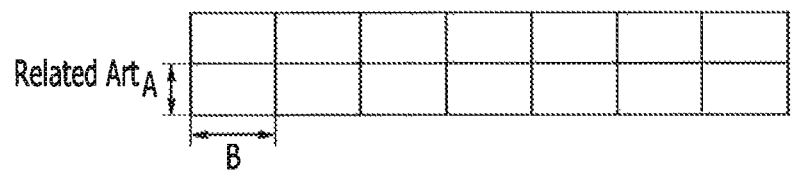
FIG. 4 is a schematic cross-sectional view illustrating a comparison between the effect of a shape of the cooling channel of the motor unit according to the present invention and that of the related art.
Figure 4:
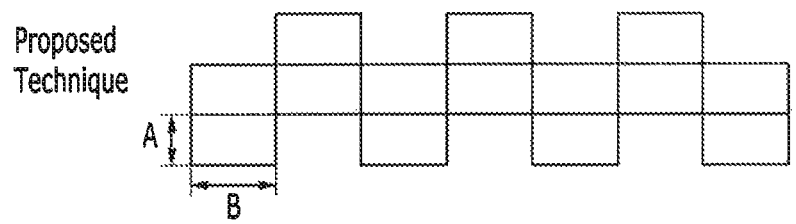

FIG. 4 is a schematic cross-sectional view illustrating a comparison between the effect of a shape of the cooling channel of the motor unit according to the present invention and that of the related art. Referring to FIG. 4, differences between the related art and the proposed technique of the present invention are shown. This is merely illustrative and actual dimensions may vary.

As shown in FIG. 4, in the related art, a unit width of a cooling channel is a*b and an overall width is 14ab. A length of a cooling surface is 14a+4b. Meanwhile, in the proposed technique of the present invention, a unit width of a cooling channel is a*b and a length of a cooling surface is 14a+16b.

Thus, by forming the cooling channel having a shape as in the proposed technique of the present invention, the length of the cooling surface can be increased to increase the cooling surface area and enhance cooling efficiency.

Figure 5:
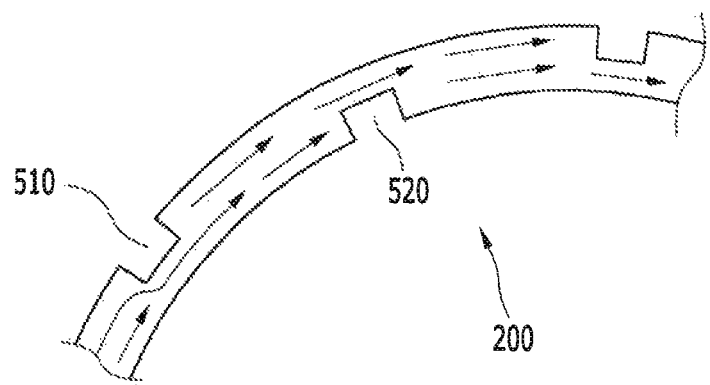
FIG. 5 is a cross-sectional view of the cooling channel of the motor unit in a length direction according to the present invention.

FIG. 5 is a cross-sectional view of the cooling channel of the motor unit in a length direction according to the present invention. Referring to FIG. 5, a cross-section of the supply channel portion 200 of the cooling channel 150 in a length direction is illustrated. Inner rib recesses 510 are formed to be spaced apart from one another in an inner side of the supply channel portion 200, and outer rib recesses 520 are formed to be spaced apart from one another in an outer side of the supply channel portion 200.

The inner rib recesses and the outer rib recesses preferably are disposed in a crisscross manner, and a flow channel of a coolant is formed to be narrow, thus increasing a flow speed of the coolant. In this manner, the increase in the flow speed of the coolant can elevate a convective heat transfer coefficient (HTC) and increase overall cooling capacity and cooling efficiency.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A motor unit comprising:
a motor housing having a motor shaft, and a rotor fixed to the motor shaft;
a stator fixed to an inner circumferential surface of the motor housing to cover the rotor disposed in one side of the motor shaft; and
a cooling channel formed within the motor housing and forming a flow channel for allowing a coolant to flow therein,
wherein the cooling channel comprises:
a supply channel portion having an inlet formed in a first end portion of the supply channel portion to allow the coolant to be introduced therethrough and extending in a circumferential direction of the motor housing;
an exhaust channel portion having an outlet formed in a first end portion of the exhaust channel portion such that it corresponds to the inlet, to allow the coolant to be discharged therethrough and extending in the circumferential direction of the motor housing; and
a flow channel changing portion connecting a second end portion of the supply channel portion and a second end portion of the exhaust channel portion to allow the coolant supplied through the inlet of the supply channel portion to be discharged through the outlet of the exhaust channel portion,
wherein at least one of inner protrusion portions and outer protrusion portions are formed on an inner circumferential surface and an outer circumferential surface, respectively, of the supply channel portion or the exhaust channel portion, protruding toward the motor shaft, and extending in a circumferential direction.

2. The motor unit of claim 1, wherein the supply channel portion includes a supply extending portion having a width extending in a direction in which the coolant flows from the inlet, and the exhaust channel portion has an exhaust reduced portion having a width reduced in a direction in which the coolant flows from the outlet.

3. The motor unit of claim 1, wherein the flow channel changing portion has a semi-circular shape.

4. The motor unit of claim 1, wherein the inner protrusion portions and the outer protrusion portions are disposed in a crisscross manner in a length direction of the motor shaft.

5. The motor unit of claim 1, wherein inner rib recesses or outer rib recesses are formed in a width direction in an inner side or outer side of the exhaust channel portion or the supply channel portion such that a flow channel of the coolant is narrowed.

6. The motor unit of claim 5, wherein the inner rib recesses or the outer rib recesses are formed at pre-set intervals in a direction in which the coolant flows, and the inner rib recesses or the outer rib recesses are formed in a crisscross manner in the direction in which the coolant flows.

7. A cooling channel for a motor housing, the cooling channel comprising:
a supply channel portion having an inlet formed in a first end portion of the supply channel portion to allow a coolant to be introduced therethrough and extending in a circumferential direction of the motor housing;
an exhaust channel portion having an outlet formed in a first end portion of the exhaust channel portion such that it corresponds to the inlet, to allow the coolant to be discharged therethrough and extending in the circumferential direction of the motor housing; and
a flow channel changing portion connecting a second end portion of the supply channel portion and a second end portion of the exhaust channel portion to allow the coolant supplied through the inlet of the supply channel portion to be discharged through the outlet of the exhaust channel portion,
wherein at least one of inner protrusion portions and outer protrusion portions are formed on an inner circumferential surface and an outer circumferential surface, respectively, of the supply channel portion or the exhaust channel portion, protruding toward the motor shaft, and extending in a circumferential direction.

* * * * *